United States Patent
Ravindra et al.

(10) Patent No.: US 11,418,584 B2
(45) Date of Patent: Aug. 16, 2022

(54) INTER-SERVICE COMMUNICATIONS

(71) Applicant: VMWARE, INC., Palo Alto, CA (US)

(72) Inventors: Pavan Kumar Alagam Bhatta Ravindra, Bangalore (IN); Pavan Rajkumar Rangain, Bangalore (IN); Mahesh Ashok Kavatage, Bangalore (IN); Suman Aluvala, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/785,672

(22) Filed: Feb. 10, 2020

(65) Prior Publication Data

US 2021/0152631 A1 May 20, 2021

(30) Foreign Application Priority Data

Nov. 14, 2019 (IN) .............................. 201941046363

(51) Int. Cl.
| | |
|---|---|
| *H04L 29/08* | (2006.01) |
| *H04L 67/1008* | (2022.01) |
| *H04L 67/1029* | (2022.01) |
| *H04L 67/51* | (2022.01) |
| *H04L 61/5007* | (2022.01) |
| *H04L 49/35* | (2022.01) |
| *H04L 49/00* | (2022.01) |
| *G06F 9/455* | (2018.01) |

(52) U.S. Cl.
CPC ...... *H04L 67/1008* (2013.01); *G06F 9/45558* (2013.01); *H04L 49/355* (2013.01); *H04L 49/70* (2013.01); *H04L 61/2007* (2013.01); *H04L 67/1029* (2013.01); *H04L 67/16* (2013.01); *G06F 2009/45595* (2013.01)

(58) Field of Classification Search
CPC . H04L 67/1008; H04L 49/70; H04L 61/2007; H04L 67/16; H04L 67/1029; H04L 49/355; G06F 9/45558; G06F 2009/45595
See application file for complete search history.

(56) References Cited

U.S. PATENT DOCUMENTS

| | | | |
|---|---|---|---|
| 2011/0209148 A1* | 8/2011 | Yamasaki | G06F 11/2005 718/1 |
| 2015/0281171 A1* | 10/2015 | Xiao | H04L 61/2532 709/225 |
| 2016/0094661 A1* | 3/2016 | Jain | H04L 67/327 709/227 |
| 2019/0068491 A1* | 2/2019 | Tsirkin | H04L 45/38 |
| 2020/0301748 A1* | 9/2020 | Gupta | G06F 16/27 |

* cited by examiner

*Primary Examiner* — Kim T Nguyen
(74) *Attorney, Agent, or Firm* — Dentons US LLP

(57) ABSTRACT

This disclosure describes various ways in which a client agent can be incorporated into multiple virtual machines of a server cluster to keep track of the location of each instance of services running on the server cluster and facilitate rapid connection of different services on the server cluster as needed. When a first service requests connection to a second service, a client agent co-located with the first service is able to forward the request to a virtual network interface card (VNIC) associated with the second service. The VNIC is configured to forward the request to an available instance of the second service. The location of the services are determined and stored on one or more service registries right after the service instances are instantiated, removing the need for a search when new requests are received.

18 Claims, 8 Drawing Sheets

Local Service Registry 502

| Service Name | VNIC IP Address | Host Name | Port Number |
|---|---|---|---|
| Stock Service | IP Address 1 | Localhost | Port 1 |
| Stock Service | IP Address 1 | Host 112 | Port 2 |
| UI Backend | IP Address 2 | Localhost | Port 3 |
| Gateway | IP Address 3 | Host 122 | Port 4 |
| ProductDB | IP Address 4 | Host 132 | Port 5 |
| UI Backend | IP Address 2 | Host 122 | Port 6 |
| UI Backend | IP Address 2 | Host 122 | Port 7 |

Hosts File 504

| Host Name | VNIC IP Address |
|---|---|
| Stock Service | IP Address 1 |
| UI Backend | IP Address 2 |
| Gateway | IP Address 3 |
| ProductDB | IP Address 4 |

VNIC IP Tables Forward Rules 506

| VNIC IP Address | Forward Address | |
|---|---|---|
| | Host Name | Port # |
| IP Address 1 | Localhost | LB Port 1 |
| IP Address 2 | Localhost | LB Port 2 |
| IP Address 3 | Host 122 | Port 4 |
| IP Address 4 | Host 132 | Port 5 |

Central Service Registry 508

| Service Name | Host Name | Port Number |
|---|---|---|
| Stock Service | Host 102 | Port 1 |
| Stock Service | Host 112 | Port 2 |
| UI Backend | Host 102 | Port 3 |
| Gateway | Host 122 | Port 4 |
| ProductDB | Host 132 | Port 5 |
| UI Backend | Host 122 | Port 6 |
| UI Backend | Host 122 | Port 7 |

*FIG. 5*

INTER-SERVICE COMMUNICATIONS

RELATED APPLICATIONS

Benefit is claimed under 35 U.S.C. 119(a)-(d) to Foreign Application Serial No. 201941046363 filed in India entitled "INTER-SERVICE COMMUNICATIONS" on Nov. 14, 2019, by VMWARE, Inc., which is herein incorporated in its entirety by reference for all purposes.

FIELD

The present disclosure relates generally to managing the mapping of multiple instances of different services on a server to enable efficient access to those services.

BACKGROUND

Service-based architectures often run large numbers of services distributed across many different hosts. These services often need to communicate with each other and/or be accessed by off-site users. Invoking these services using a hardcoded URL does not work in these types of multi-host environment (e.g. a server cluster) since the host names and/or IP addresses are not typically fixed. Also, advancements such as auto-scaling where one service is served from multiple hosts need a mechanism for services to discover the location of other services dynamically. For this reason, a way of automatic service resolution based on a service name that allows access to the service without the need to know the actual host name or port the service resides on is desirable.

SUMMARY

This disclosure describes systems and methods enabling efficient communication between different services running on a server cluster. In particular, a configuration is described in which client agents located within virtual machines of the server cluster track the location of the services running on the server cluster to facilitate the efficient communication.

In one embodiment, a computer implemented method for managing processes within a server cluster is described. The method is performed to establish a connection between a first service running on or off the server cluster and a second service running on the server cluster. A service can take many forms including that of a monolith, container or database. The method includes receiving a request from a first service to connect to a second service. When a connection has not previously been established, the first service may not have the location information, e.g. host and port information, necessary to connect to the second service. The location information can be retrieved from an entry in the hosts file locally available in the VM. This process is called name resolution and it resolves the name of second service to the associated VNIC. In alternative embodiments, the location information can be retrieved from an entry in a service registry stored in one or more locations on the server cluster and used to help locate a virtual network interface card (VNIC) associated with the second service. The first service connection request is then forwarded to the VNIC. A client agent associated with the service registry was responsible for creating the VNIC when it first discovered the second service being registered on the server cluster. The number of VNICs created by client agents on each VM will generally be equal to the number of different services running on the cluster.

The VNIC includes an IP Tables forwarding rule that forwards the connection request directly to the second service or to a load balancing port of a client agent located in the same VM as the VNIC. In embodiments where the VNIC forwards the connection request to a load balancing port, the load balancing port can remain in the communication path to keep the load allocated to two or more instances of the second service evenly distributed.

This disclosure also describes ways in which the hosts file, local and central service registries are kept current and updated as soon as or shortly after new services are instantiated. Services are also removed and/or updated at regular intervals when the services are discontinued or moved to different locations on the server cluster. The solution also supports legacy applications and services without any code changes and supports a wide variety of technologies on which the applications are implemented.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

FIG. 5 shows exemplary service registries and IP Tables forward rules.

DETAILED DESCRIPTION

Figure 1:
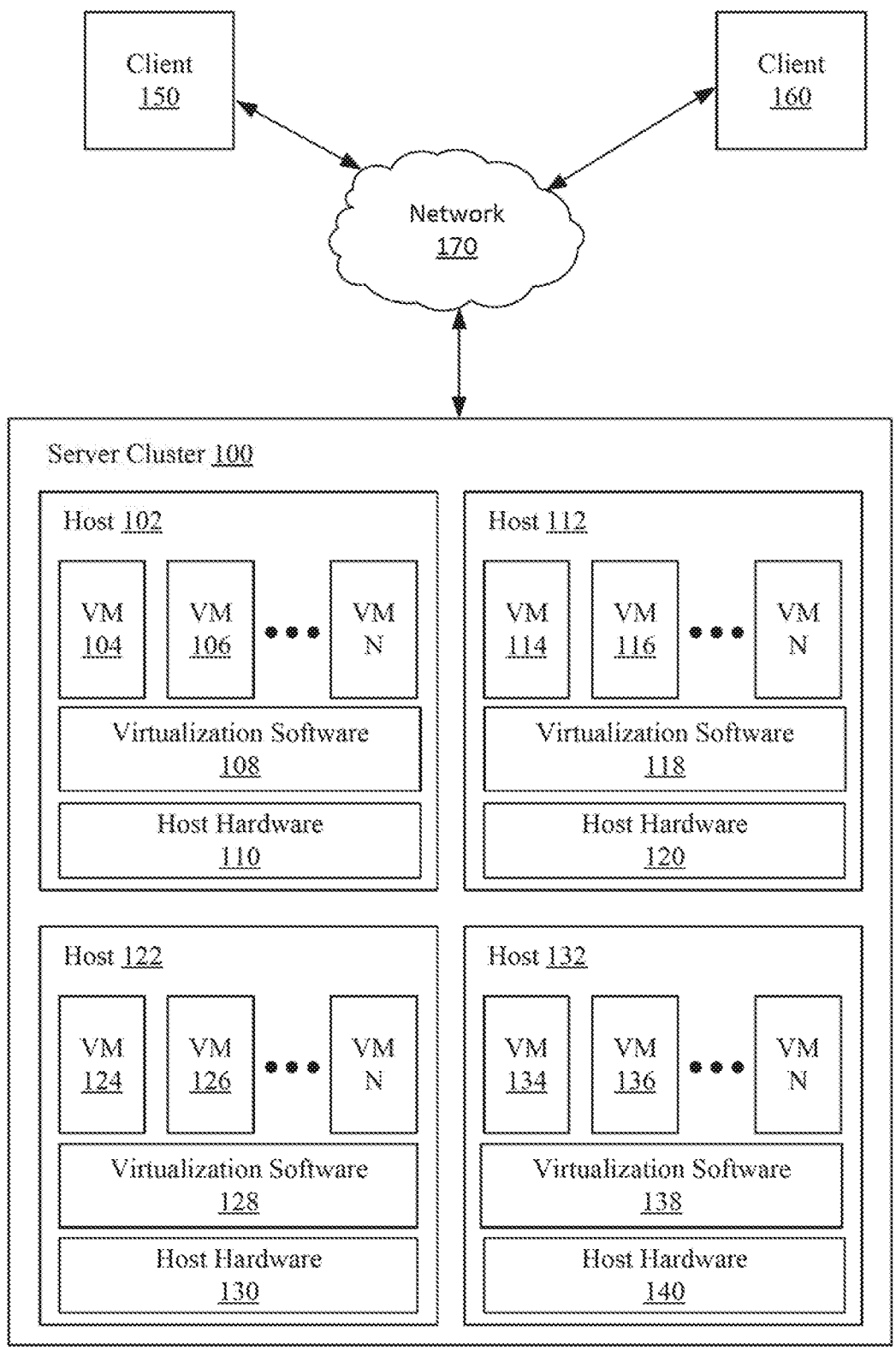
FIG. 1 is a block diagram illustrating an exemplary server cluster according to an embodiment of the invention.

Certain details are set forth below to provide a sufficient understanding of various embodiments of the invention. However, it will be clear to one skilled in the art that embodiments of the invention may be practiced without one or more of these particular details. Moreover, the particular embodiments of the present invention described herein are provided by way of example and should not be used to limit the scope of the invention to these particular embodiments. In other instances, hardware components, network architectures, and/or software operations have not been shown in detail in order to avoid unnecessarily obscuring the invention.

Client agent software can be incorporated into VMs residing on a server cluster to track the location of multiple services running on various VMs distributed throughout the server cluster. This in turn enables service redirections without the need for developers to add code to their applications to enable the redirects. When a new service is instantiated for the first time on a server cluster, the client agent running on the VM in which the new service was instantiated detects the instantiation and directs a VNIC to be created on the VM and associated with the new service. The IP address of the VNIC is configured in the hosts file (in the /etc/hosts location in linux VMs) such that any name resolution requests for the service name resolves to the VNIC IP address. The service name, host name and port details of the service are also stored in a local service registry that includes all active services on the cluster. It should be appreciated that the hosts file may have a different location depending on the operating system but the /etc/hosts file location will be used for exemplary purposes only. At least a portion of this local service registry entry is propagated to a central service registry and then to other local service registries of the server cluster. Once the service registries on remote VMs are updated, the remote VMs will be reconfigured by creating a VNIC, adding a hosts entry and IP Tables forwarding rule similar to the originating VM. Once this reconfiguration is complete, any connection attempt using the service name will be forwarded to the IP address of the VNIC created for the service.

When a new instance of the already registered service is instantiated, the client agent makes a modification to the IP tables of the VNIC to support load balancing. In this case, the VNIC and hosts entry already exists, but the IP tables are hardcoded to the first instance. To achieve load balancing across both instances, the client agent starts a load balancing (LB) port and the IP Tables forwarding rule associated with the VNIC is updated so that traffic sent to the VNIC is forwarded to the LB port of the client agent. The LB port helps to route connection requests based on a load balancing process in accordance with service entries on the local service registry. When additional instances of the service are instantiated on the server cluster, updating the local service registry allows the LB port to distribute connection requests to the additional and existing instances of the service.

The described embodiments improve the discovery process since the services are pre-discovered before an application or service begins to initiate a connection. This configuration also reduces the number of hops since the configurations are handled by OS level network configurations. Single service instances are able to send packets that are directly routed at the OS level without the need to route the packets through the client agent.

These and other embodiments are discussed below with reference to FIGS. 1-5; however, those skilled in the art will readily appreciate that the detailed description given herein with respect to these figures is for explanatory purposes only and should not be construed as limiting.

FIG. 1 is a block diagram illustrating an exemplary server cluster 100 according to an embodiment of the invention. Server cluster can include hosts 102, 112, 122 and 132. While a four host system is shown for exemplary purposes it should be appreciated that server cluster 100 could include a larger or smaller number of hosts. Each host 102-132 includes host hardware 110-140, which can include a designated amount of processing, memory, network and/or storage resources. In some embodiments, each of the hosts provide the same amount of resources, and in other embodiments, the hosts are configured to provide different amounts of resources to support one or more VMs running on the hosts. Each of the VMs can be configured to run a guest operating system that allows for multiple applications or services to run within the VM.

Each of hosts 102, 112, 122 and 132 are capable of running virtualization software 108, 118, 128 and 138, respectively. The virtualization software can run within a VM and includes management tools for starting, stopping and managing various virtual machines running on the host. For example, host 102 can be configured to stop or suspend operations of virtual machines 104 or 106 utilizing virtualization software 108. Virtualization software 108, commonly referred to as a hypervisor, can also be configured to start new virtual machines or change the amount of processing or memory resources from host hardware 110 that are assigned to one or more VMs running on host 102. Host hardware 110 includes one or more processors, memory, storage resources, I/O ports and the like that are configured to support operation of VMs running on host 102. In some embodiments, a greater amount of processing, memory or storage resources of host hardware 110 is allocated to operation of VM 104 than to VM 106. This may be desirable when, e.g., VM 104 is running a larger number of services or running on a more resource intensive operating system than VM 106. Clients 150 and 160 are located outside server cluster 100 and can request access to services running on server cluster 100 via network 170. Responding to the request for access and interacting with clients 150 and 160 can involve interaction with a single service or in other cases may involve multiple smaller services cooperatively interacting to provide information requested by clients 150 and/or 160. A central service registry within the cluster can be configured to connect the clients to an IP address of a VNIC that then forwards the clients to a first service configured to provide a desired type of interaction with the client. In some embodiments, the first service can provide a listing of service resources available on the server cluster. Network 170 can take the form of the internet or a smaller private network. This configuration allows server cluster 100 to support services such as internal web applications or larger public facing websites for remote clients.

Hosts 102, 112, 122 and 132, which make up server cluster 100, can also include or have access to a storage area network (SAN) that can be shared by multiple hosts. The SAN is configured to provide storage resources as known in the art. While description is made herein with respect to the operation of the hosts 102-132, it will be appreciated that those of hosts 102-132 provide analogous functionality, respectively. Exemplary software components associated with VM 104 running on host 102 are described below with respect to FIG. 2.

Figure 2A:
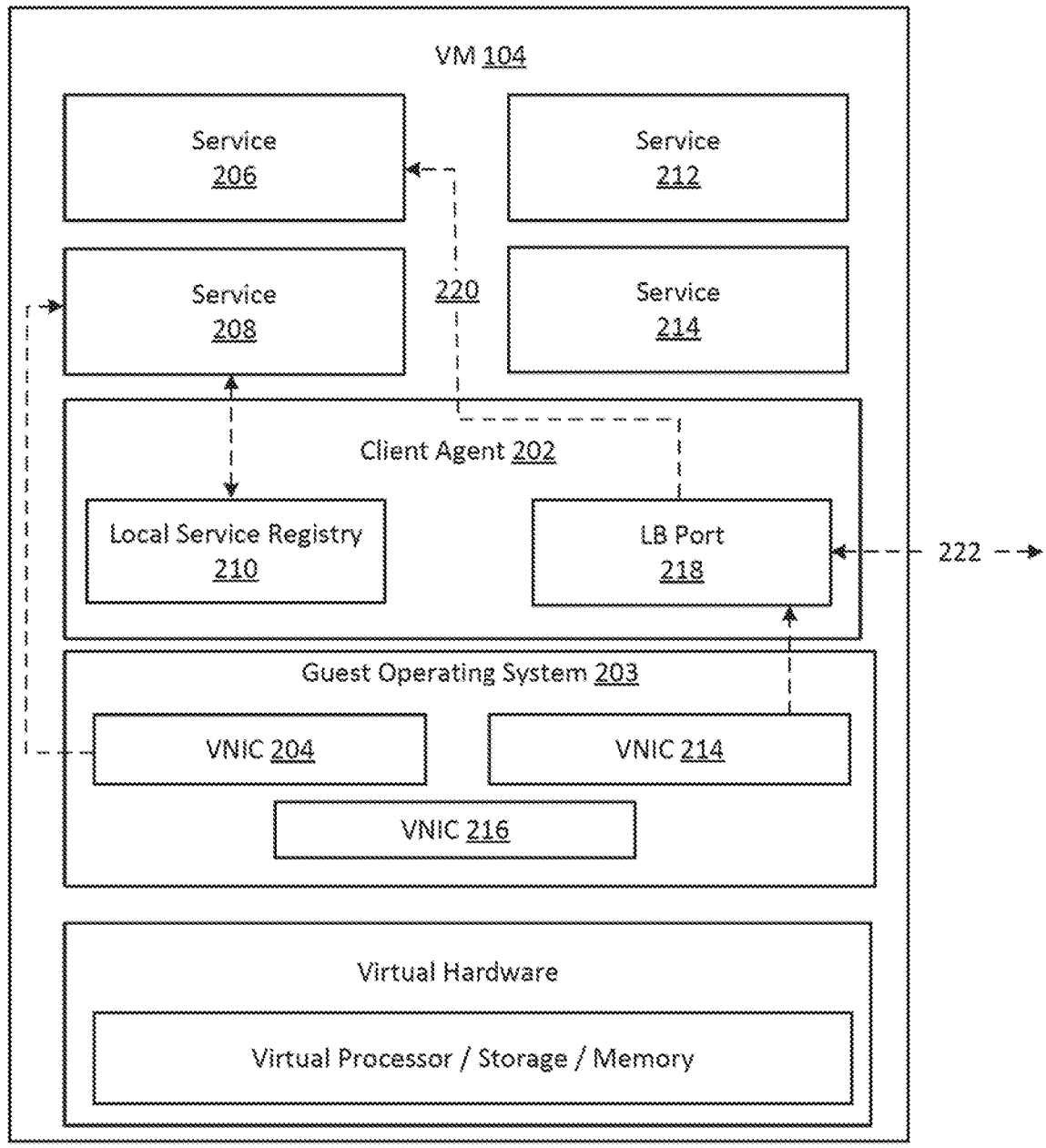
FIG. 2A shows a block diagram depicting components of an exemplary VM of a server cluster as depicted in FIG. 1.

FIG. 2A shows a block diagram illustrating exemplary components of VM 104 of server cluster 100 as depicted in FIG. 1. Client agent 202 is disposed within VM 104 and configured to implement improvements in routing traffic efficiently between services running on server cluster 100. In some embodiments, client agent 202 takes the form of a software tool incorporated into the software used to install VM 104. Client agent 202 runs on guest operating system 203 and is configured to direct creation of a new VNIC 204 within VM 104 when a first instantiation of a service within server cluster 100, e.g. service 208, is detected on VM 104. VNIC 204 can include an IP Tables forward rule that directs connection requests from another service to service 208. Once the connection is established the packets will flow between the requesting service and service 208 through the established connection. The established connection will continue to be routed through the VNIC itself. An IP address of the new VNIC can be stored along with the service name in a local service registry 210. The IP address, host name, port number and service name information can then be sent to a central service registry located elsewhere in the cluster. The central registry can then synchronize the newly received information to the other local registries positioned in the user agents of each of the other VMs in the server cluster so that the service location information can be synchronized throughout server cluster 100.

Client agent 202 can also include one or more LB ports 218. Client agent 202 can be configured to create a new LB port, e.g. depicted LB port 218, when a second instantiation of a service associated with one of VNICs 204, 214 and 216 is detected. The second instantiation of the service can instantiated in another VM such as VM 106 as depicted in FIG. 1. The newly created LB port 218 includes a listing of the location of both the first and second instantiations of the service associated with the VNIC, thereby allowing LB port 218 to redirect traffic forwarded to LB port 218 by VNIC 214 to different instances of service 206 in accordance with a load balancing algorithm that helps distribute loading of the instances of service 206 as shown by arrow 220 pointing to a local instance of service 206 and arrow 222 pointing outside of VM 104 to a remote instance of service 206. It should be appreciated that for services with larger number of users, LB port 218 can be configured to distribute traffic to services 206 distributed within VMs of host 102 as well as to instances of service 206 outside of host 102, within any of hosts 112, 122 and 132 of server cluster 100. The port number and host name associated with various instances of service 206 and used by LB port 218 is maintained within local service registry 210 since local service registry 210 is co-located with LB port 218 within client agent 202. In this way, LB port 218 connects inbound requests to the appropriate instantiation of the service with which it is associated.

Services 206, 208, 212 can resolve the location of other services by performing name resolution on the VM's host file. For example, if service 208 needs to communicate with another service the IP address for the VNIC associated with that service can be quickly retrieved from the hosts file. Service 208 can then be configured to send a connection request to the retrieved IP address of the VNIC, which then forwards the request to the requested service.

Figure 2B:
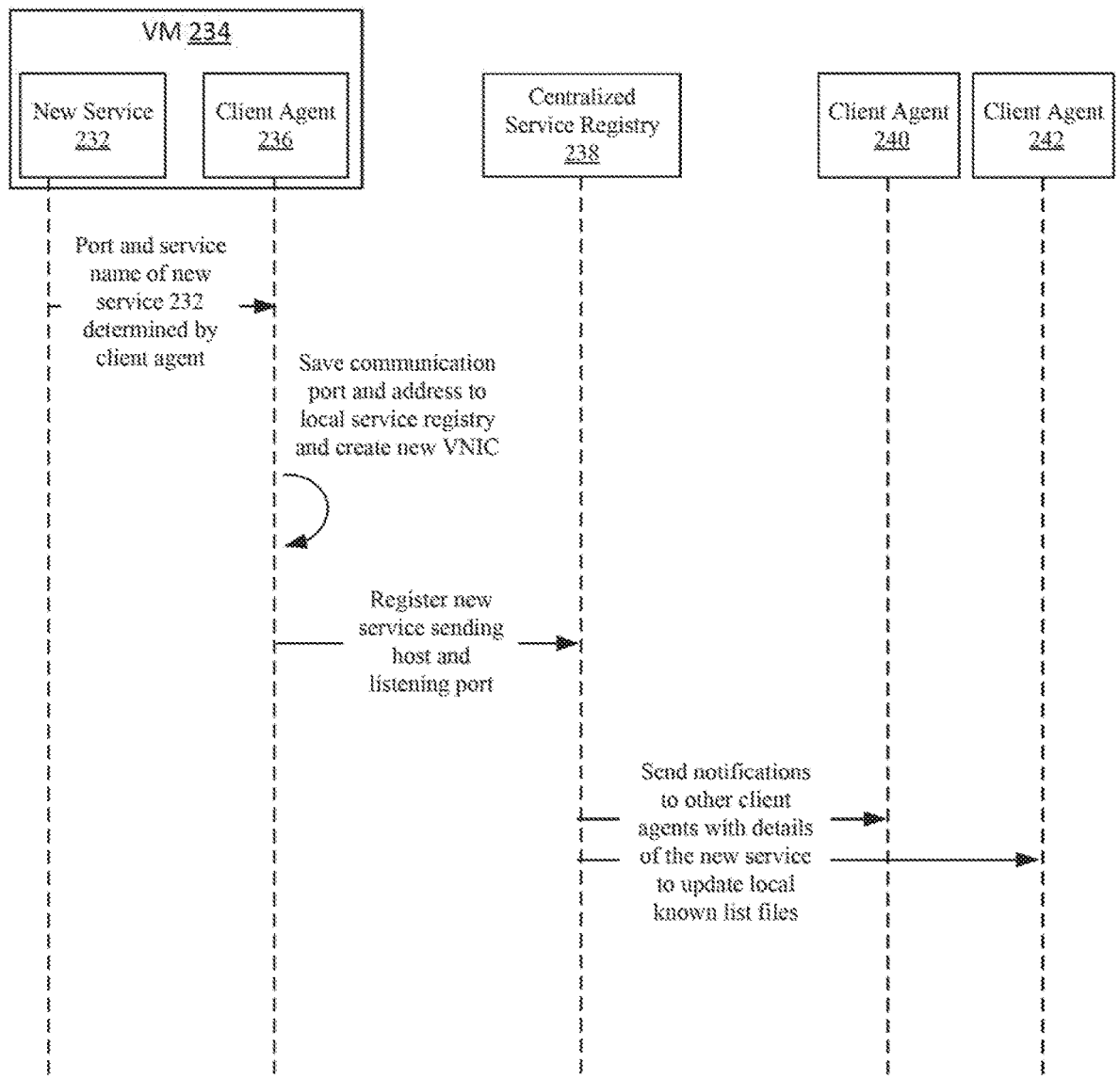
FIG. 2B shows how the location of a newly instantiated service is registered when no other instances of the service reside on the server cluster.

FIG. 2B shows how the location of a newly instantiated service is registered when no other instances of the service reside on the server cluster. FIG. 2B shows new service 232 being instantiated within a VM 234. Client agent 236, which is also positioned within VM 234, is configured to identify its communication port and resolve the service name of service 232. The service name can be resolved from a process identifier (PID), a unique number associated with each of the running processes in an operating system. In some embodiments additional processing can be applied to determine a name of service 232. For example, a service name for a docker application can be the name of the container in which it resides. For java applications, commands like JPS can be used to obtain more specific information about the name of the service. More generally, the client agent may include or have access to a lookup table that can be used to find a common service name associated with a particular PID or container name. The new process registration is terminated when new service 232 does not include a listening port allowing service 232 to receive communications. Client agent 236 then proceeds to direct the creation of a new VNIC for the new service. The communication port, host name, VNIC IP address and service name are then stored on the local service registry of client agent 236. The client agent associated with the local service registry is responsible for notifying the central service registry 238 of the change by sending at least the service name, host and port number to central service registry 238. In alternative embodiments, the VNIC address is also transmitted to central service registry 238 for distribution to client agents in remote VMs. It should be appreciated that multiple central service registries can be maintained to prevent a situation in which the only VM or host running the central service registry goes out of operation or reboots and then negatively impacts the capability of the server cluster to maintain accurate tracking of services running on the server cluster.

Central service registry 238 is then responsible for synchronizing the received information across the cluster and does so by sending notifications with the received new service details to other client agents 240 and 242. Central service registry 238 can be maintained within one or more VMs or hosts of the server cluster. The central service registry can contain some of the same list of service entries as the local service registries but may also include additional information such as information pertinent to operation of the VM or host. It should be appreciated that while only two additional client agents are depicted, a larger number of client agents will generally be expected given that there is generally one client agent running in each VM operating in the server cluster.

Figure 3A:
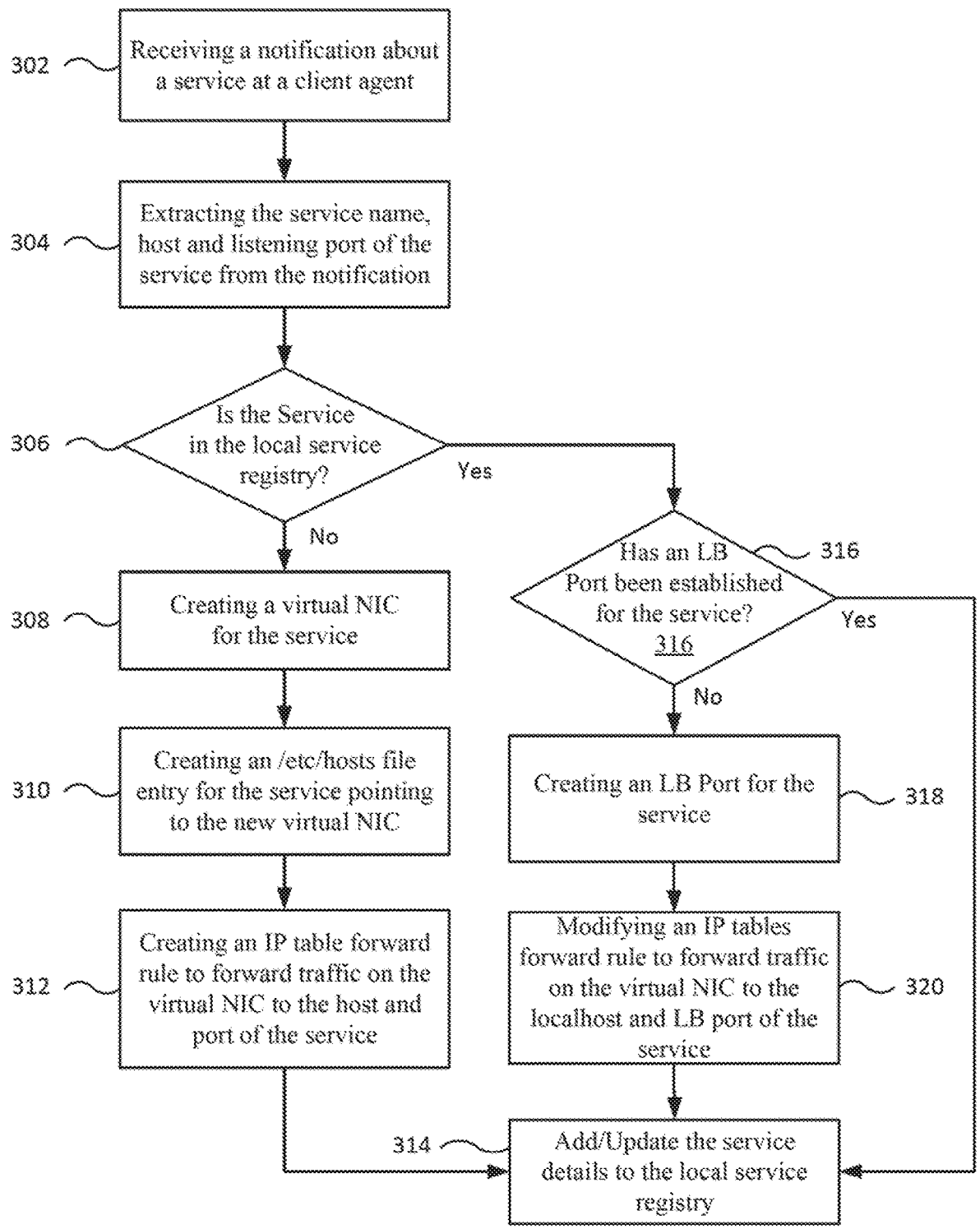
FIG. 3A shows a flow chart describing how new services running on a server cluster are identified and registered by a client agent.

FIG. 3A shows a flow chart describing how VMs are configured to enable communications between services when a new service notification is received. At 302, a notification is received from the central registry informing the client agent of the instantiation of the new service. Client agents located outside of the VM in which the new service is created detect the new service by receiving a notification from the central service registry informing the client agent of the new service creation. When the client agent shares the same VM as the new service, the client agent includes a detection component that detects the new service being instantiated within the VM. The detection component of the client agent can be configured to identify new services by monitoring the VM for creation of any new listening ports on the machine that accept inbound traffic. Each of these detected listening ports can be treated as a new service. In alternative embodiments, the detection component can also be configured to detect services being instantiated outside of the VM in which it resides.

At 304, the service name, host and listening port of the service are extracted from the notification. In embodiments in which the client agent detects the service, the service name can be resolved from a process identifier (PID), a unique number associated with each of the running processes in an operating system. In some embodiments, additional processing can be applied to determine a name of the service. For example, a service name for a docker application can be the name of the container in which it resides. For java applications, commands like JPS can be used to obtain more specific information about the name of the service. More generally, the client agent may include or have access to a lookup table that can be used to find a common service name associated with a particular PID or container name. The process is terminated at this step when the service does not include a listening port allowing the service to receive communications.

At 306, the service name is checked against the local service registry of the client agent. If the service name is not included on the local service registry, then the process proceeds to 308 in which a new VNIC is created in the same VM in which the service is instantiated. At 310, an entry is added to the hosts file, which can be maintained within the /etc/hosts file of the respective VM. At 312, an IP Tables forward rule is incorporated into the new VNIC that forwards traffic on the VNIC to the new service. At 314, the local service registry is updated with the new service details. The client agent associated with the local service registry is then responsible for notifying the central service registry of the change. It should be appreciated that multiple central service registries can be maintained to prevent a situation in which the only VM or host running the central service registry goes out of operation or reboots and then negatively impacts the capability of the server cluster to maintain accurate tracking of services running on the server cluster.

FIG. 3A also describes how in the instance where the local service registry already includes a listing for the new service, at 316 the client agent will check to see if a load balancing port has been established for the service. If an LB port has not yet been established, at 318 an LB port will be created in the client agent residing in the same virtual machine as the VNIC associated with the service. The LB port has load balancing software configured to distribute loads across each of the known instances of the service. At 320, the IP Tables forward rule of the VNIC associated with the service is modified to point to the localhost and LB port in lieu of a host and port of the previously available single instance of the service. At 314, a location (IP address) for a port of each instance of the service is added to the local service registry. In the instance where at 316 an LB port is already determined to have been established, the process moves to 314 in which the host name and port information of the new service is added to the local service registry where it can be reference by the established LB port.

While new service registration has been described above, it should be appreciated that the described embodiments can be used to update data associated with the services and to remove services in certain circumstances. For example, client agents referencing their local service registries can be configured to periodically perform health checks to confirm the continued operation of services running in their respective VMs. Health checks can take the form of checking availability and responsiveness of the service instances. When a health check fails for one of the aforementioned reasons, the service is removed from operation and the entries for the service are removed from both the local and central service registries. The client agent is also responsible for processing notifications from the central service registry and when the notifications indicate removal of a service from another VM, the client agent updates the local service registry accordingly. When a remote instance of a service is removed but two or more instances of the service remain active, the local service registry can be updated to reflect the removal of the remote instance. Where the instances are reduced to one remaining active service the LB port can be turned off and the IP Tables forward rule of the associated VNIC can be adjusted to point back to the one remaining active service.

Figure 3B:
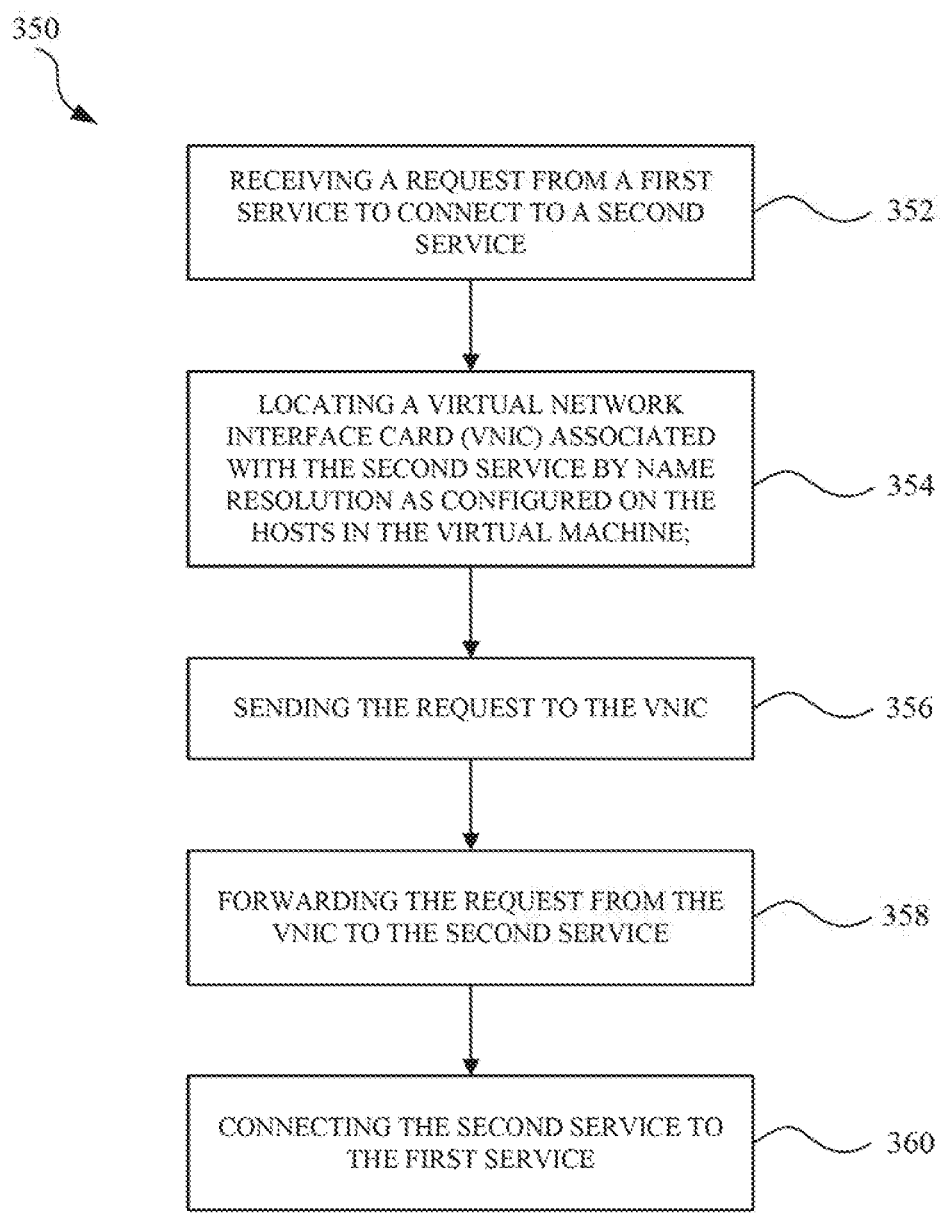
FIG. 3B shows a flow chart illustrating a method of connecting services running within a server cluster.

FIG. 3B shows a flow chart 350 illustrating a method of connecting services running within a server cluster. In particular, at 352 the server cluster receives a connection request from a first service to connect to a second service running within a VM of the server cluster. The first service can be located within or outside of the server cluster. At 354, in cases where the first service is located within the server cluster a hosts file entry of the same VM as the first service will be used to locate the VNIC associated with the second service. It should be noted that in alternative embodiments the local service registry can be used to provide the VNIC location information in lieu of the hosts file. In other alternative embodiments, when the first service is located outside of the server cluster, a VNIC associated with the second service can be located using an entry of a central service registry that includes a listing of the various named services running on the server cluster.

At 356, the connection request for the second service is initiated by name resolution using the hosts file entry, which automates the forwarding of the connection request to the VNIC associated with the second service. At 358, an IP Tables forwarding rule of the VNIC sends the connection request either directly to the second service or to an LB port that then forwards the connection request to one instance of the second service. At 360, the connection between the first and second services is established.

Figure 4A:
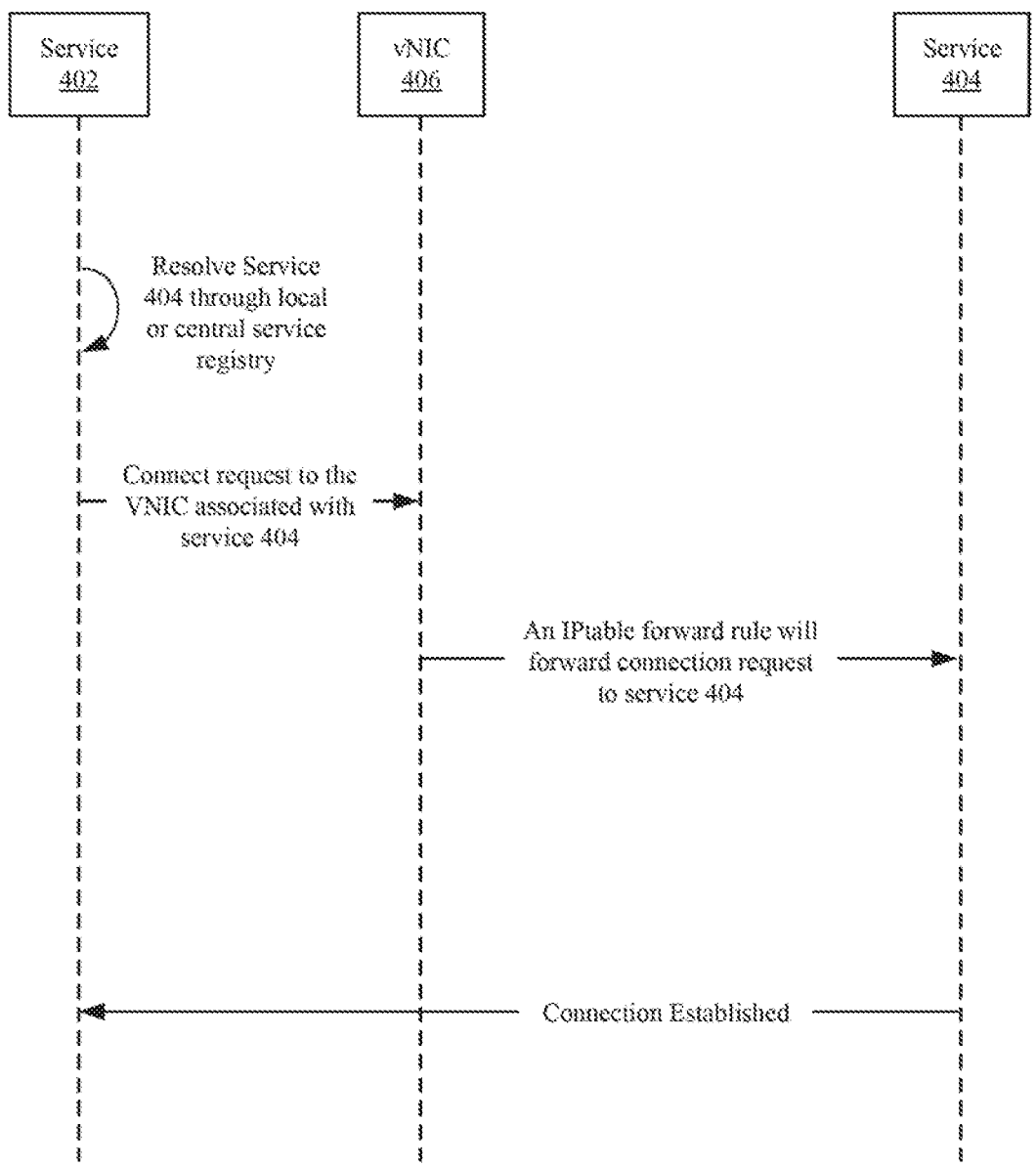
FIG. 4A shows how a first service is able to connect to a second service having only a single instance in accordance with the described embodiments.

FIG. 4A shows how a first service is able to connect to a second service having only a single instance in accordance with the described embodiments. In the case service 402 needs to communicate or collaborate with service 404 in some way, service 402 can resolve service 404 via hosts file to determine VNIC 406 as the target IP address. After this resolution, a request is initiated to VNIC 406, which has an IP Tables rule to forward requests to actual address of service 404. An IP Tables forward rule will then forward the connection request to service 404. Once the connection is established all the further communication between the services like TLS handshakes, request/responses will happen on the established connection. It should be appreciated that at some point the connection may have to be reestablished using the method depicted in FIG. 4A. For example, a port of one of the two services could have a change in port number after a service reset or the service could be reassigned to another VM or host again resulting in a change of the port and/or host of the services. This change in port number would be updated in the local and central service registries, which could allow the connection between services 402 and 404 to be re-established using the method illustrated in FIG. 4A.

Figure 4B:
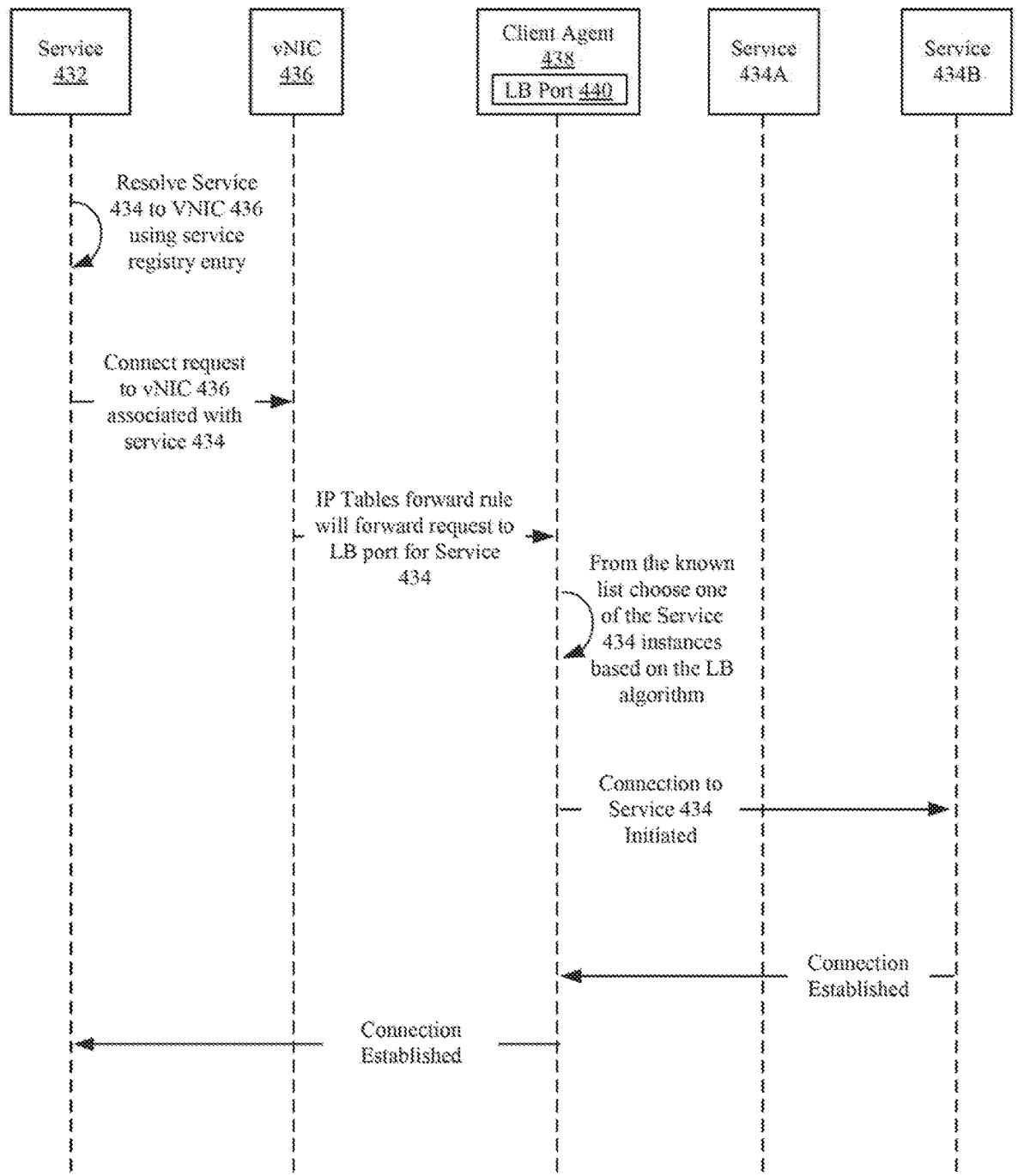
FIG. 4B shows a service requesting access to another service having at least two different instances.

FIG. 4B shows service 432 requesting access to service 434, which includes at least two instances 434A and 434B. Service 432 begins by resolving the location of VNIC 436, which is associated with service 434, using name resolution with the hosts file. VNIC 436 includes an IP Tables forward rule that forwards the connection request to an LB port 440 of client agent 438. LB port 440 is then responsible for sending the connection request to instance 434A or 434B depending on the current loading of each of instances 434A and 434B. In the case the connection is established with service 434B, the connection is first established back to LB port 440 and then from LB port 440 back to service 432. In other embodiments, communication may continue to be routed through LB port 440, which allows LB port to continue to balance the distribution of services between the different instances of service 434.

FIG. 5 shows exemplary service registries, IP Tables forward rules and hosts file listings. In particular, local service registry 502 is shown including seven exemplary entries associated with four different services running on the cluster. Host name and port number column information is included for all the services since this information is used to identify known services and support the load balancing ports of the client agent. Multiple entries are included for the multi-instanced services to allow the host name and port number for each instance of the service to be listed. For example, two instances of the service named stock service are mapped to IP Address 1 and the associated VNIC. Hosts file entries 504 shares the same VM as local service registry 502 and lists only the VNIC IP address of each of the four services running on the cluster. In alternative embodiments, only one of the hosts or local service registry is needed.

Since the local service registry contains all the information included in the hosts file, omission of the hosts file would not result in the loss of any information. It should also be appreciated that the local registry file could be omitted and the host and port number information could instead be incorporated directly into registries associated with each load balancing ports. For this reason, the hosts file, central and local service registries can each be referred to generally as a service registry.

VNIC IP Tables Forward Rule 506 shows a hard coded IP Tables forward rule that points directly to an instance of the Gateway service. The IP Tables forward rule can be directed toward the service itself because only one instance of that service is currently running on the cluster. The host name is localhost because the VNIC shares the same VM as the first instance of the service. VNIC IP Tables Forward Rule 506 points to an LB Port of the client agent for one of the multi-instanced services running on the server cluster. This configuration does not require modification when an instance is added or subtracted since this configuration allows additional instances of the multi-instanced service to be added to the cluster without needing to update the IP Tables Forward rule of the VNIC. In some embodiments, the server cluster could also be configured to route traffic connecting to a single instance service through a load balancing port to avoid the additional overhead involved in updating the IP Tables forward rule when the single instance service becomes a multi-instance service.

Central service registry 508 will include at least the host name, port number and service name of each service. In alternative embodiments, central service registry 508 also includes the VNIC IP address. Entries of central service registry 508 illustrate how multiple instances of the UI Backend service can be running on the same host, in this example host 122. Central service registry 508 may not include a VNIC address columns as in some embodiments this information is only needed in the local service registry and hosts file that includes the VNIC address for the service.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A computer implemented method for managing services within a server cluster, comprising:
   receiving a request from a first service running on a first virtual machine (VM) to connect to an instance of a plurality of instances of a second service running on a second VM of the server cluster;
   locating a virtual network interface card (VNIC) associated with the second service using an entry in a local service registry stored within the server cluster;
   sending the request to the VNIC; and
   forwarding the request from the VNIC to the instance of the second service to establish a connection between the instance of the second service and the first service, wherein each VM of the server cluster includes a respective local service registry and wherein the local service registries are synchronized with each other.

2. The computer implemented method as recited in claim 1, wherein the VNIC is running on a third VM located within the server cluster.

3. The computer implemented method as recited in claim 1, wherein the first service is running within the first VM on a first host and the instance of the second service is running on a second host different from the first host.

4. The computer implemented method as recited in claim 1, wherein forwarding the request from the VNIC to the instance of the second service comprises:
   sending the request to a load balancing port; and
   sending the request from the load balancing port to the instance of the second service.

5. The computer implemented method as recited in claim 4, wherein the load balancing port selects the instance from two or more instances of the plurality of instances of the second service in accordance with a current load being handled by the two or more instances of the second service.

6. The computer implemented method as recited in claim 1, wherein the second service is a database service or a user interface backend service.

7. The computer implemented method as recited in claim 1, wherein the local service registry comprises an entry for each active service running on the server cluster, each entry comprising a host name and VNIC location for its respective active service.

8. A non-transitory computer-readable storage medium storing instructions configured to be executed by one or more processors of a computing device cause the computing device to carry out steps that include:
   receiving a request from a first service running on a first virtual machine (VM) to connect to an instance of a plurality of instances of a second service running on one or more VMs running on the computing device;
   sending the request to a virtual network interface card (VNIC) associated with the second service using an entry in a local service registry stored within the computing device; and
   sending the request to the VNIC, the VNIC being configured to forward the request to the instance of the second service to establish a connection between the first service and the instance of the second service
   wherein each VM of the computing device includes a respective local service registry and wherein the local service registries are synchronized with each other.

9. The non-transitory computer-readable storage medium as recited in claim 8, wherein the VNIC includes an IP Tables forwarding rule that includes a host name and a port number of the instance of the second service.

10. The non-transitory computer-readable storage medium as recited in claim 8, wherein the VNIC is configured to forward the request to the instance of the second service by sending the request to a load balancing port that is configured to send the request to the instance of the second service.

11. The non-transitory computer-readable storage medium as recited in claim 8, wherein locating the VNIC associated with the second service comprises retrieving an internet protocol (IP) address of the VNIC from the service registry.

12. The non-transitory computer-readable storage medium as recited in claim 11, wherein the entry of the local service registry includes at least a service name and the IP address for the VNIC associated with the instance of the second service.

13. The non-transitory computer-readable storage medium as recited in claim 8, wherein the VNIC is separate and distinct from the instance of the second service.

14. A computer system, comprising:
   one or more processors; and
   memory storing one or more programs configured to be executed by the one or more processors, the one or more programs including instructions for:
      receiving a request from a first service running on a first virtual machine (VM) to connect to an instance of a plurality of instances of a second service running on a second virtual machine;
      locating a virtual network interface card (VNIC) associated with the second service using on an entry of a local service registry stored within the computer system;
      sending the request to the VNIC; and
      forwarding the request from the VNIC to the instance of the second service to connect the instance of the second service to the first service,
   wherein each VM of the computer system includes a respective local service registry and wherein the local service registries are synchronized with each other.

15. The computer system as recited in claim 14, wherein the computer system is a server cluster.

16. The computer system as recited in claim 14, wherein the VNIC includes an IP Tables forwarding rule that includes both a host and port information for the second service.

17. The computer system as recited in claim 14, further comprising a first host and a second host, the first service operating on the first host and the second service operating on the second host.

18. The computer system as recited in claim 14, wherein locating the VNIC associated with the second service comprises retrieving an internet protocol (IP) address of the VNIC from the service registry.

\* \* \* \* \*